Oct. 27, 1964

P. RICHARDSON ETAL 3,154,706

COOLING OF ROTOR CONDUCTORS OF DYNAMO-ELECTRIC MACHINES

Filed May 7, 1962

Oct. 27, 1964   P. RICHARDSON ETAL   3,154,706
COOLING OF ROTOR CONDUCTORS OF DYNAMO-ELECTRIC MACHINES
Filed May 7, 1962   2 Sheets-Sheet 2

United States Patent Office 3,154,706
Patented Oct. 27, 1964

3,154,706
COOLING OF ROTOR CONDUCTORS OF
DYNAMO-ELECTRIC MACHINES
Philip Richardson, Hugo Heinrich Ludolf Ritz, and Manfred Otto Engel, Newcastle-upon-Tyne, England, assignors to C. A. Parsons & Company Limited, Newcastle-upon-Tyne, England
Filed May 7, 1962, Ser. No. 193,370
3 Claims. (Cl. 310—54)

This invention relates to the cooling of rotor conductors of dynamo-electric machines.

It is customary with large alternating current generators of the kind used in power stations to cool both the rotor and stator windings in order to be able to increase the current rating of the generator without substantially increasing the size of the conductors.

The conductors constituting the rotor winding are located in slots in a rotor core and end portions of the conductors extend beyond the core at each end thereof.

In order to obtain a maximum increase in the current which the rotor conductors will carry it is desirable to eliminate as far as possible any temperature differences occurring between the slot embedded portions of the conductors and those portions extending beyond the core.

The object of the present invention is to provide an improved cooling arrangement for the rotor conductors of dynamo-electric machines by which the aforementioned temperature difference is substantially reduced below what it would otherwise be.

The invention consists in a cooling arrangement for the rotor conductors of a dynamo-electric machine in which arrangement the conductors have closed cooling circuits formed therein each circuit extending from a portion of a conductor located in a rotor slot to a portion located outside the slot, heat developed in portions of the conductors outside the slots being removed by a cooling fluid circulating in said circuits and given up by said cooling fluid to a coolant cooling the conductor portions in the rotor slots.

The invention also consists in a cooling arrangement for the rotor conductors of a dynamo-electric machine in accordance with the preceding paragraph in which each closed cooling circuit comprises two passages extending longitudinally of the conductor one above the other in a radial direction and two or more radial passages connecting the longitudinal passages.

The invention also consists in a cooling arrangement substantially as described below.

Referring to the accompanying drawings.

Figure 1:
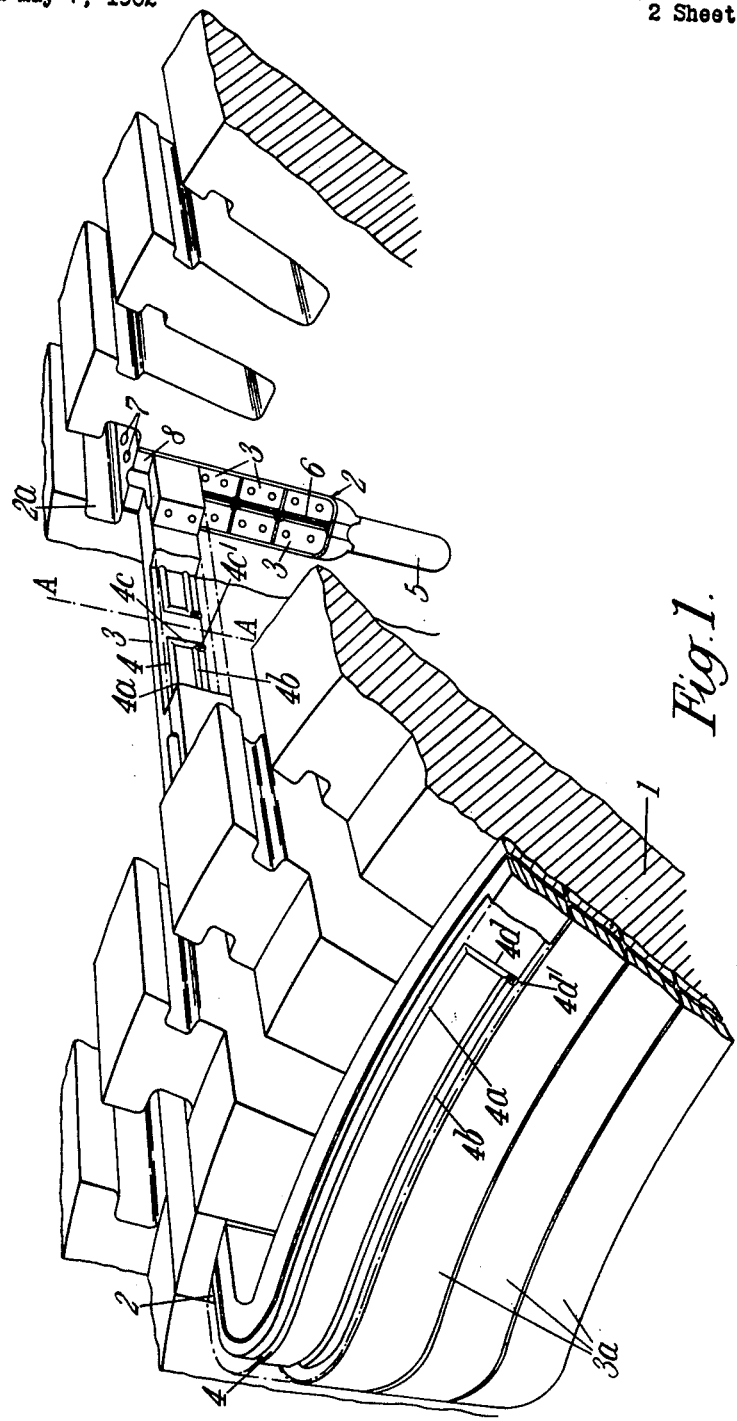
FIGURE 1 shows a perspective view of a cooling arrangement in accordance with one form of the present invention.

In carrying the invention into effect in the forms illustrated by way of example and referring first of all to FIGURE 1, a portion of a rotor 1 of an alternating current generator of the kind used in large power stations is shown. Parts of the portion illustrated have been cut away to show more clearly the cooling arrangement. The rotor comprises a series of slots 2 each containing a number of conductors 3. The conductors have end portions 3a which extend beyond the slots 2 at each end thereof. The conductors each contain closed circuits 4 each circuit being formed by two longitudinal passages 4a, 4b arranged one above the other in a radial direction. The passages 4a, 4b are connected at their ends by radial passages 4c, 4d. Each circuit extends from a portion of a conductor lying in a slot 2 to the portion 3a lying outside the slot. In the form illustrated there are four such circuits in a conductor each circuit extending from a position adjacent line AA which is mid-way along the axial length of the part of the conductors located in the slots, to a position adjacent the mid-point of the part of the conductors located outside the rotor slots. Each circuit, therefore occupies a length approximating to one quarter the length of whole conductor.

The radial passages 4c, 4d may be formed by drilling the conductor as indicated in FIGURE 1. Portions 4c' and 4d' are then to be plugged to ensure a closed circuit.

In the construction illustrated in FIGURE 1 the parts of the conductors lying in the slots are cooled by coolant which enters the slots from channels 5 and flows radially outward between the conductors which are spaced in a slot in columns on either side of a central radial passage 6 which communicates with channels 5. The coolant leaving passage 6 passes through holes 7 in a slot packer 8 and thence through similar holes 9 in a slot wedge 10 (shown in FIGURE 2) in the T-shaped upper part 2a of the slot 2, to the surface of the rotor.

The closed circuit 4 contains a cooling fluid preferably a liquid such as water which circulates by virtue of the thermal syphon effect produced by the temperature difference between the part of the conductor 3a and the slot embedded portion. The thermal syphon effect is assisted by rotational forces. The heat developed in the parts 3a of the conductors is thus transported by the cooling fluid in the closed circuits 4 to the slot embedded portions where it is removed by conventional cooling methods such as the radial form of cooling shown in FIGURE 1 and described above.

Figure 2:
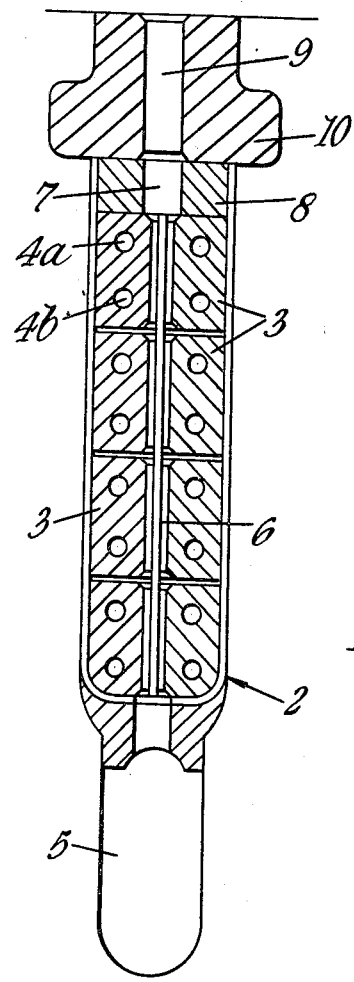
FIGURE 2 shows a section through a conventional rotor slot showing conductors arranged and constructed in accordance with the form of the invention illustrated in FIGURE 1.

Referring to FIGURE 2 the arrangement of slot insulation is conventional and is as used in known rotors with radial cooling of the conductors in the rotor slots.

To assist the circulation in the closed circuits 4 part of the end portions 3a of the conductors may be displaced radially with respect to the slot embedded portions. In the latter case the closed circuit may take the form of a single passage extending from the slot-embedded portion to the end portion 3a of a conductor instead of the form illustrated.

The cooling fluid used in the closed circuits may be liquid, gaseous or a vaporizable liquid.

With the arrangement described the temperature difference between the parts of the conductors outside the slots and those parts inside the slots is substantially reduced below what it would otherwise be which allows an increased current to be circulated through the conductors.

We claim:

1. A cooling arrangement for rotor conductors of dynamo-electric machines of the type including a rotor having axially-extending conductor-receiving slots therein, conductors including slot-embedded portions disposed in said slots and extending axially of the rotor and other portions disposed exteriorly of the rotor extending generally circumferentially thereof, each conductor having internally thereof conduits having closed opposite ends, coolant medium within the conduits, each conduit having one of the closed ends disposed in the conductor at a position along its axial extent intermediate the ends of the slot-embedded portions of the conductors and the opposite closed end being disposed in a portion of the conductor located exteriorly of the rotor so that a closed cooling circuit is established between the closed ends of each conduit, and means operatively related with the rotor for circulating cooling fluid against at least the conductor portions within the slots whereby heat developed in the portions of the conductors located exteriorly of the rotor is removed by the coolant medium circulating in the conduits responsive to thermal-syphon effect and centrifugal force due to rotation of the rotor and given up to the cooling fluid in contact with conductor portions within the slots.

2. A cooling arrangement for the rotor conductors of dynamo-electric machines as claimed in claim 1 in which each closed cooling circuit comprises two passages extending axially of the conductor and spaced one above the other in a radial direction and at least two radial passages connecting said axially-extending passages.

3. A cooling arrangement for the rotor conductors of dynamo-electric machines as claimed in claim 1 in which each closed circuit comprises a single passage closed at its opposite end, one closed end being disposed in an axially-extending portion of the conductor at a location intermediate the ends of the slot-embedded portions of the conductors and the passage of the other closed end being disposed in a circumferentially-extending portion of the conductor exteriorly of the rotor and at least a portion of the passage in the circumferentially-extending portion of the conductor being tilted in a radial direction relative to the axially-disposed slot-embedded portion of the conductors to assist the centrifugal head.

References Cited in the file of this patent

UNITED STATES PATENTS

| | | |
|---|---|---|
| 1,739,137 | Gay | Dec. 10, 1929 |
| 2,722,616 | Moses | Nov. 1, 1955 |

FOREIGN PATENTS

| | | |
|---|---|---|
| 949,757 | Germany | Sept. 27, 1956 |